United States Patent

Baughn et al.

[11] Patent Number: 6,101,435
[45] Date of Patent: Aug. 8, 2000

[54] METHOD FOR COMPENSATING A POWER ASSIST STEERING SYSTEM CONTROL SIGNAL

[75] Inventors: Bernard Dale Baughn, Livonia; John Robert Grabowski, Dearborn; Ross Maxwell Stuntz, Birmingham, all of Mich.

[73] Assignee: Ford Global Technologies, Inc., Dearborn, Mich.

[21] Appl. No.: 09/088,338

[22] Filed: Jun. 1, 1998

[51] Int. Cl.[7] .............................. B62D 6/00; B62D 5/065
[52] U.S. Cl. ............................ 701/41; 180/422; 180/442
[58] Field of Search ....................... 701/41, 42; 180/422, 180/442, 443

[56] References Cited

U.S. PATENT DOCUMENTS

| | | | |
|---|---|---|---|
| 4,392,540 | 7/1983 | Michio et al. ........................... | 180/422 |
| 4,441,572 | 4/1984 | Ito et al. . | |
| 4,476,529 | 10/1984 | Nakamura et al. . | |
| 4,557,343 | 12/1985 | Pickering ................................ | 180/422 |
| 4,609,431 | 9/1986 | Grose et al. . | |
| 4,834,204 | 5/1989 | Ito et al. . | |
| 4,840,359 | 6/1989 | Hamaekers et al. . | |
| 5,267,627 | 12/1993 | Frank et al. . | |
| 5,289,894 | 3/1994 | Yoshiyuki . | |
| 5,564,516 | 10/1996 | Nimblett, Jr. et al. .................. | 180/423 |
| 5,713,429 | 2/1998 | Doolittle ................................ | 180/423 |
| 5,761,627 | 6/1998 | Seidel et al. ............................ | 701/41 |
| 5,954,152 | 9/1999 | Kada et al. ............................ | 180/422 |
| 5,967,253 | 10/1999 | Collier-Hallman ..................... | 180/421 |

FOREIGN PATENT DOCUMENTS 2-249-530  5/1992  United Kingdom .

*Primary Examiner*—Michael J. Zanelli
*Attorney, Agent, or Firm*—Gregory P. Brown

[57] ABSTRACT

A method is provided for controlling an electro-hydraulic power assist steering system including a variable-speed electric motor for pumping hydraulic fluid in the system. The method includes monitoring vehicle speed and vehicle steering wheel angle. A vehicle yaw rate is estimated using the monitored vehicle speed and monitored vehicle steering wheel angle. A control signal for setting the speed of the variable speed electric motor is compensated based based on the estimated vehicle yaw rate. Accordingly, a wide range of vehicle driving conditions are accommodated and vehicle fuel efficiency is improved.

17 Claims, 2 Drawing Sheets

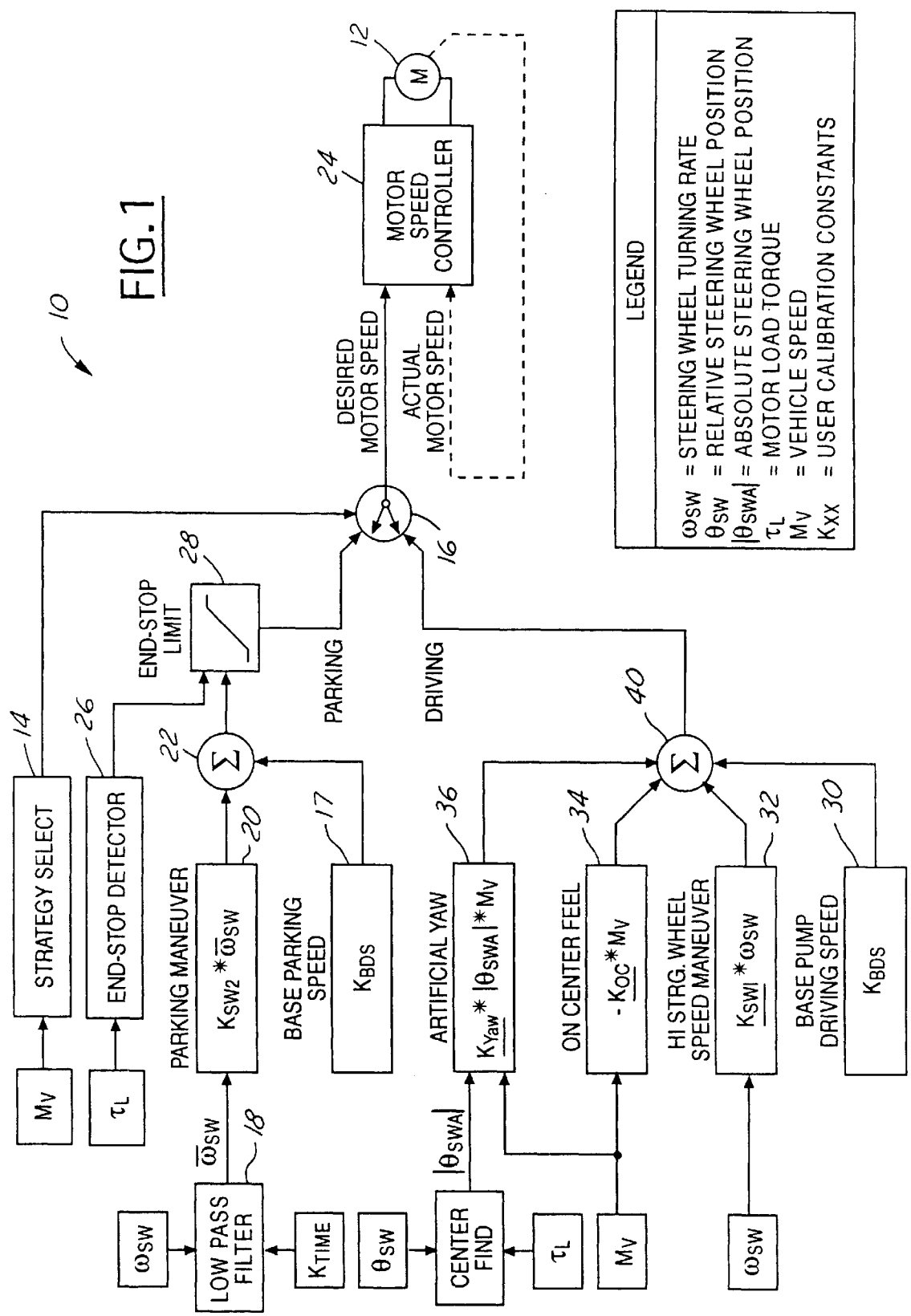

METHOD FOR COMPENSATING A POWER ASSIST STEERING SYSTEM CONTROL SIGNAL

TECHNICAL FIELD

The present invention relates to a method for controlling an electro-hydraulic power assist steering. More particularly, the present invention provides a method for compensating a power assist steering system control signal during steady state steering events.

BACKGROUND OF THE INVENTION

In conventional power assist steering systems, hydraulic fluid used for assisting steering action is directly driven by the engine, which typically results in a 2% to 4% efficiency loss because a substantial amount of energy from the engine is used to pump hydraulic fluid in the power assist steering system when no steering assist is needed. Typically, the percentage of time in which a vehicle driver is actually turning the steering wheel in a manner which requires power assist is very small. However, because a significant amount of force is required for steering assist in certain situations, generally a high base pumping rate is maintained to provide rapid ramp-up for steering assist when needed. This high base pumping rate results in the significant efficiency losses.

The use of electric motors in driving the power assist hydraulic fluid has resulted in an improvement in efficiency. However, it is further desirable to provide optimal power steering assist under a variety of vehicle operating conditions while maintaining a substantially low base pump speed for optimal efficiency. Preferably, the pump will run at a very slow speed when not needed, while having the capacity to quickly ramp-up to a desired speed when required. The system must be robust, which may be achieved by limiting the number of sensors used, and must also be economical and not prone to failure.

Known prior art systems provide electric motors which have only two speeds, high and low, which is undesirable for noise and efficiency reasons. One prior art system described in U.S. Pat. No. 5,508,919 to Suzuki et al. provides improved control systems, however, relies upon pressure control, rather than controlling motor speed for flow control, therefore it still requires metering valve adjustability. Such a system will provide only minor efficiency improvements. Because such a system would operate at a constant pump flow, all of the system tuning to accommodate different vehicle applications must be achieved through complicated modifications to the metering valve, which results in a compromise between the performances during the various steering modes.

It is therefore desirable to provide a power assist steering control system in which efficiency is significantly improved while providing optimal power steering assist under a variety of vehicle handling conditions.

SUMMARY OF THE INVENTION

The present invention provides a method of controlling an electro-hydraulic power assist steering system in which the speed of a variable-speed electric motor is controlled based upon monitored vehicle speed, vehicle steering wheel angle, and vehicle steering wheel turning rate. In this manner, system efficiency may be optimized by maintaining a substantially low base motor speed while providing needed power steering assist in a wide variety of vehicle operating conditions.

More specifically, the present invention provides a method of compensating a control signal for an electro-hydraulic power assist steering system including a variable-speed electric motor for pumping hydraulic fluid in the system. The method includes: a) monitoring vehicle speed; b) monitoring vehicle steering wheel angle; c) establishing a base motor speed; d) estimating a vehicle yaw rate; e) calculating a yaw compensation factor in proportion to the estimated vehicle yaw rate; and f) generating a desired motor speed signal from the base motor speed and the yaw compensation factor.

Accordingly, an object of the present invention is to provide an improved method of controlling an electro-hydraulic power assist steering system in which the speed of a variable speed electric motor is compensated based upon vehicle speed, and vehicle steering wheel angle in order to optimize efficiency and enhance power steering assist performance under a wide variety of vehicle operating conditions.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 shows a schematic block diagram of a control system in accordance with the present invention.

DETAILED DESCRIPTION OF THE PREFERRED EMBODIMENT

Figure 5:
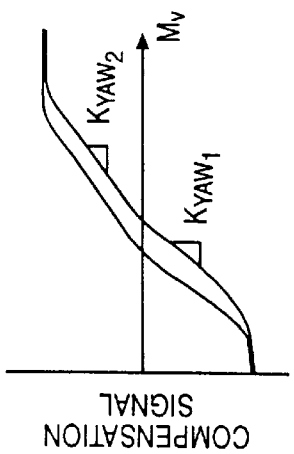
FIG. 5 shows a graphical representation of a compensation signal generated in accordance with an alternative embodiment of the present invention.

The control system 10 shown in FIG. 1 in accordance with the present invention is part of an electro-hydraulic power assist steering system which uses an electric motor 12 to drive a hydraulic pump, which in turn produces the system pressure used to move the steering rack. The pump flow is continuously varied, preferably every millisecond, by control of the speed of the electric motor. This control technique provides the minimum amount of flow required to maintain good steering feel without wasting energy. This method of control provides a substantial improvement in efficiency over other electro-hydraulic and conventional power steering systems, since both generally provide excessive pump flow during most steering conditions.

Using variable flow and an improved strategy permits the optimization of each steering mode, independent of the others, through appropriate control of the pump flow. Further, the steering system response can be widely reconfigured through unique and even driver specific calibrations of the control software, offering many new alternatives for customized steering feel.

This algorithm uses vehicle speed ($M_V$), steering wheel relative position ($\theta_{SWA}$) and steering wheel turning rate ($\omega_{SW}$) as the control inputs. It is notable that the system does not require a yaw sensor, a torque sensor or a separate steering wheel turning rate sensor, thus reducing the cost and complexity of the present invention relative to those that require this additional hardware. Using this information, three driving conditions and one parking condition may be identified and accommodated. The three driving conditions are: on-center, evasive maneuver, and constant radius turning. Each of the driving conditions has an independent strategy, with a unique set of calibration parameters for that particular condition. Each mode is then independently calibrated for optimum performance without interacting with the optimized tuning of the other driving conditions. These calibration parameters allow for a wide range of system tuning which can provide different configurations for different vehicle lines, vehicle models, individual driver preference, and individual markets, all without any hardware changes; therefore, reducing the complexity of the hardware.

FIG. 1 shows the electro-hydraulic power assist steering control system block diagram of the present invention. The system 10 is broken into two modes, a parking control mode and a driving control mode, each with an independent strategy. The selection between the modes is based upon the vehicle speed $M_V$. The selection is illustrated at block 14. The selection process is used to control a switch 16. If the vehicle speed is less than approximately 4 mph, then the parking control mode is selected, and the driving mode is selected if the vehicle speed $M_V$ is greater than approximately 4 mph.

In the parking control mode, the main input is the steering wheel turning rate signal $\omega_{SW}$. In this parking mode, a base parking speed is established, as indicated at block 17. Motor speed is increased in proportion to the monitored steering wheel turning rate $\omega_{SW}$. The monitored steering wheel turning rate $\omega_{SW}$ enters a low pass filter 18, and the adjustment is calculated at block 20, and the desired motor speed signal is generated at the summation block 22 by adding the product of $K_{SW2}*\overline{\omega}_{SW}$ to the base parking speed. The "K" values in this description are calibration constants. In this manner, a motor speed command is generated by the motor speed controller 24 in response to the desired motor speed.

When the steering wheel is rotated to the end of travel, on the end stop, large pressures can be built up in an electro-hydraulic, as well as a conventional power steering system. With this improved strategy, the end stop is sensed, as represented at block 26, by the monitoring of the motor torque load $\tau_L$, which is proportional to the current demand of the electric motor 12. This is achieved by limiting the motor with a predetermined maximum torque limit ($+/-K_\tau$) which corresponds to the torque load realized when the end stop is reached. During attempts to hold the rack at the end stop, the system will limit power consumption to a small level by limiting the desired motor speed command, as represented by the limiter block 28. The parking control strategy functions (17,20,26) are calibrated using constants ($K_{BPS}$, $K_{TIME}$, $K_{SW2}$, $K_\tau$) for optimizing performance during operation.

When the switch 16 is in the driving control mode, each of the three components of the desired motor speed are designed to be independently functioning and independently tunable. A base motor speed is established, as represented by block 30. The base motor speed is set at a low level such that while the vehicle is driving straight ahead, only a small amount of flow is supplied by the base motor speed block 30. During conditions that demand fast steering system response, the maneuver compensation block 32 rapidly increases the desired motor speed by an amount proportional to the steering wheel turning rate $\omega_{SW}$ to allow the steering system to provide fast response. This aspect of the control is independently tunable through the calibration constant $K_{SWT}$.

Additionally, as the vehicle speed $M_V$ increases, the desired motor speed is reduced by an amount proportional to the vehicle speed in order to maintain a good, solid on-center steering feel, as represented by block 34. This aspect of the control is independently tunable through the calibration constant $K_{OC}$.

Figure 2:
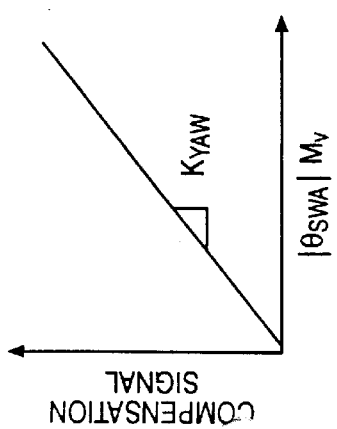
FIG. 2 shows a graphical representation of a compensation signal generated in accordance with the present invention.

During sharp, high speed turns, large forces would build up on the steering wheel, however, the artificial yaw block 36 prevents this situation by adjusting the desired motor speed to counteract these yaw forces. In the presently preferred embodiment, the desired motor speed is adjusted by an amount according to the following relationship:

$$K_Y|\theta_{SWA}|M_V$$

where $K_Y$ is the yaw calibration constant, $|\theta_{SWA}|$ is the steering wheel angle and $M_V$ is the vehicle speed. In essence, this provides a proportional yaw compensation factor proportional to an estimate of the absolute value of the theoretical yaw rate for the vehicle, a signal corresponding to this factor is graphically illustrated in FIG. 2.

An alternative to continuously compensating desired motor speed for all yaw forces, it may be desirable to selectively compensate the desired motor speed only for large turns. This has the advantage of providing a desirable driver feel during small steering events at higher speeds, such as lane changes, while providing the assist necessary to counter the steering forces required for sharper and longer high speed turns. As a further benefit, an increase in system efficiency is realized by reducing the time artificial yaw control requires additional motor speed.

Figure 3:
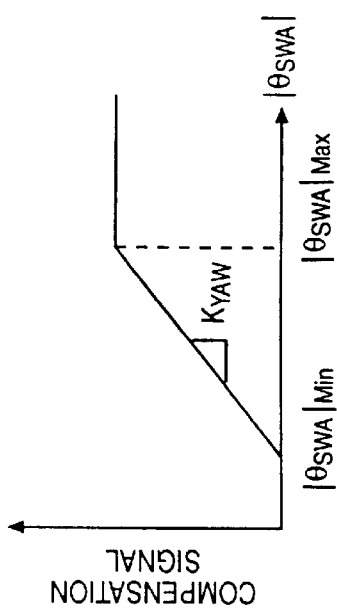
FIG. 3 shows a graphical representation of a compensation signal generated in accordance with an alternative embodiment of the present invention.

FIG. 3 illustrates the resultant compensation signal representative of the compensation factor generated by block 36 when the system differentiates large and small turns. It can be seen that no compensation factor is generated until the steering wheel angle exceeds a predetermined minimum steering wheel angle, $|\theta_{SWA}|_{MIN}$, which is presently set in the range of 10–20 degrees. For steering wheel angles in excess of the predetermined minimum steering wheel angle, the compensation factor is proportional to the estimated vehicle yaw, as determined by the product described above.

It has also been observed that for steering wheel angles greater than a predetermined maximum steering wheel angle, $|\theta_{SWA}|_{MAX}$, it is desirable to provide a constant compensation factor rather than continuing to provide proportional compensation factor. Presently, the predetermined maximum steering wheel angle is generally set within the range of 45–55 degrees. Advantageously, this limits the ultimate assist resulting from sharp, high speed turns, yet another aspect that improves both driver feel and system efficiency.

Figure 4:
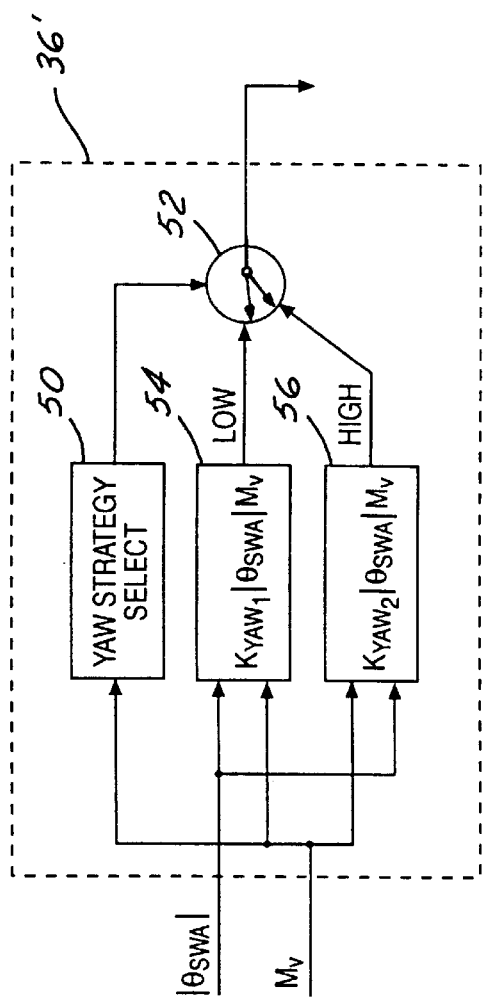
FIG. 4 shows a schematic block diagram of a portion of a control system in accordance with an alternative embodiment of the present invention.

Referring now to FIGS. 4 and 5, an alternative to the artificial yaw block 36 will be described. The artificial yaw block 36' is broken into two modes, a low speed mode and a high speed mode, each having a unique function for determining the yaw compensation factor. The selection between the modes is based upon the vehicle speed $M_V$. The selection is illustrated at block 50 and controls a switch 52. Generally, switching between the two modes occurs at vehicles speeds of about 40 mph, with the low speed mode being selected for lower speed operation below a second predetermined vehicle speed and the high speed mode being selected for higher speed operation above a third predetermined vehicle speed, which may actually be equal to the second predetermined vehicle speed, but not necessarily.

During operation in the low speed mode, yaw block 54 determines the compensation factor which is proportionally related to the estimated vehicle yaw rate by a unique low speed yaw gain, $K_{YAW1}$. During operation in the high speed mode, a yaw block 56 determines the compensation factor which is proportionally related to the estimated vehicle yaw by a unique high speed yaw gain, $K_{YAW2}$. It should be recognized by those skilled in the art that a higher order function may be desirable rather than the purely proportional expression just described. For instance, FIG. 5 illustrates a function that gradually transitions the yaw compensation factor.

It can also be seen that the low speed yaw gain, $K_{YAW1}$ is negative, effectively reducing the base motor speed and corresponding assist and the high speed yaw gain, $K_{YAW2}$, is positive, effectively increasing the base motor speed and corresponding assist. The two gains may have equal or unique magnitudes, as shown, depending on the calibration desired.

Together, the various substrategies 30, 32, 34, 36 maintain a consistent steering feel throughout the entire range of driving situations by continuously adjusting the desired motor speed at the summation block 40. It is estimated that this system has the potential for fuel economy improvements of 1% to 3%, while delivering smooth, quiet, responsive power steering assist.

While the best mode for carrying out the invention has been described in detail, those familiar with the art to which this invention relates will recognize various alternative designs and embodiments for practicing the invention within the scope of the appended claims.

What is claimed is:

1. A method of compensating a control signal for an electro-hydraulic power assist steering system including a variable-speed electric motor for pumping hydraulic fluid in the system, the method comprising:
   monitoring vehicle speed;
   monitoring vehicle steering wheel angle;
   establishing a base motor speed;
   estimating a vehicle yaw rate;
   calculating a yaw compensation factor in proportion to said estimated vehicle yaw rate; and
   generating a desired motor speed signal from said base motor speed and said yaw compensation factor.

2. The method of claim 1, wherein said step of calculating said yaw compensation factor occurs continuously.

3. The method of claim 1, wherein said estimated vehicle yaw rate is determined as a product of said monitored vehicle speed and an absolute value of said monitored vehicle steering wheel angle.

4. The method of claim 1, wherein said step of calculating said yaw compensation factor only occurs if said monitored vehicle speed is greater than a first predetermined vehicle speed.

5. The method of claim 1, wherein said step of calculating said yaw compensation factor only occurs if said monitored vehicle steering wheel angle is greater than a first predetermined vehicle steering wheel angle.

6. The method of claim 1, wherein said step of calculating said yaw compensation factor saturates when said monitored vehicle steering wheel angle exceeds a second predetermined vehicle steering wheel angle, said yaw compensation factor being set equal to a constant value while said monitored vehicle steering wheel angle exceeds said second predetermined vehicle steering wheel angle.

7. The method of claim 1, wherein said step of calculating said yaw compensation factor includes using a low speed yaw gain for monitored vehicle speeds below a second predetermined vehicle speed and a high speed yaw gain for monitored vehicle speeds above a third predetermined vehicle speed.

8. The method of claim 7, wherein said low speed yaw gain reduces said desired motor speed signal and said high speed yaw gain increases said desired motor speed signal.

9. A method of compensating a control signal for an electro-hydraulic power assist steering system including a variable-speed electric motor for pumping hydraulic fluid in the system, the method comprising:
   monitoring vehicle speed;
   monitoring vehicle steering wheel angle;
   monitoring vehicle steering wheel turning rate;
   establishing a base motor speed;
   estimating a vehicle yaw rate; and
   generating a desired motor speed signal from said base motor speed and a proportional yaw compensation factor calculated from said estimated vehicle yaw rate when said monitored vehicle steering wheel angle is greater than a first predetermined vehicle steering wheel angle and from said base motor speed and a constant yaw compensation factor when said monitored vehicle steering wheel angle exceeds a second predetermined vehicle steering wheel angle.

10. The method of claim 9, wherein said estimated vehicle yaw rate is determined as a product of said monitored vehicle speed and an absolute value of said monitored vehicle steering wheel angle.

11. The method of claim 9, wherein said step of generating a desired motor speed signal uses said proportional yaw compensation factor and said constant yaw compensation factor only if said monitored vehicle speed is greater than a first predetermined vehicle speed.

12. The method of claim 9, wherein said step of generating a desired motor speed signal includes using a low speed yaw gain for monitored vehicle speeds below a second predetermined vehicle speed and a high speed yaw gain for monitored vehicle speeds above a third predetermined vehicle speed.

13. The method of claim 12, wherein said low speed yaw gain reduces said desired motor speed signal and said high speed yaw gain increases said desired motor speed signal.

14. A method of compensating a control signal for an electro-hydraulic power assist steering system including a variable-speed electric motor for pumping hydraulic fluid in the system, the method comprising:
   monitoring vehicle speed;
   monitoring vehicle steering wheel angle;
   monitoring vehicle steering wheel turning rate;
   establishing a base motor speed;
   estimating a vehicle yaw rate; and
   generating a desired motor speed signal from said base motor speed and a proportional yaw compensation factor calculated using a low speed yaw gain for monitored vehicle speeds between a first predetermined vehicle speed and a second predetermined vehicle speed and using a high speed yaw gain for monitored vehicle speeds above a third predetermined vehicle speed.

15. The method of claim 14, wherein said estimated vehicle yaw rate is determined as a product of said monitored vehicle speed and an absolute value of said monitored vehicle steering wheel angle.

16. The method of claim 14, wherein said step of generating a desired motor speed signal only includes the proportional yaw compensation factor when said monitored vehicle steering wheel angle is greater than a first predetermined vehicle steering wheel angle.

17. The method of claim 14, wherein said low speed yaw gain reduces said desired motor speed signal and said high speed yaw gain increases said desired motor speed signal.

* * * * *